US010815687B2

(12) United States Patent
Carrillo Alonso et al.

(10) Patent No.: US 10,815,687 B2
(45) Date of Patent: Oct. 27, 2020

(54) WIND TURBINE ASSEMBLY SYSTEM AND ASSOCIATED METHOD

(71) Applicant: ACCIONA WINDPOWER, S.A., Sarriguren (Navarra) (ES)

(72) Inventors: Luis Carrillo Alonso, Sarriguren (ES); Manuel Biedma Garcia, Sarriguren (ES); Iván García Maestre, Sarriguren (ES); Ander Gastón Lujambio, Sarriguren (ES); Teresa Arlabán Gabeiras, Sarriguren (ES); Jose Miguel García Sayés, Sarriguren (ES); Miguel Núñez Polo, Sarriguren (ES)

(73) Assignee: ACCIONA WINDPOWER, S.A., Sarriguren (Navarra) (ES)

( * ) Notice: Subject to any disclaimer, the term of this patent is extended or adjusted under 35 U.S.C. 154(b) by 0 days.

(21) Appl. No.: 15/337,646

(22) Filed: Oct. 28, 2016

(65) Prior Publication Data
US 2017/0121998 A1 May 4, 2017

(30) Foreign Application Priority Data

Oct. 30, 2015 (EP) .................................... 15003102

(51) Int. Cl.
*E04H 12/34* (2006.01)
*F03D 13/20* (2016.01)
(Continued)

(52) U.S. Cl.
CPC ......... *E04H 12/342* (2013.01); *B66C 23/185* (2013.01); *B66C 23/207* (2013.01);
(Continued)

(58) Field of Classification Search
CPC ....... E04H 12/18; E04H 12/182; E04H 12/20; E04H 12/34; E04H 12/342; E04H 12/344; F03D 13/20; F03D 13/25; F05D 13/20; F05D 13/25; F05B 2240/916; F05B 2240/917; F05B 2240/96; F05B 2230/61; B66C 23/00; B66C 23/18; B66C 23/185; B66C 23/203; B66C 23/207; B66C 23/34; B66C 23/342

See application file for complete search history.

(56) References Cited

U.S. PATENT DOCUMENTS 6,868,646 B1 3/2005 Perina
8,011,098 B2 * 9/2011 Vorhies ................... B66C 17/06
                                                                 212/176
(Continued)

FOREIGN PATENT DOCUMENTS

EP         2851328 A1      3/2015
WO      2011031577 A2      3/2011

*Primary Examiner* — Jessica L Laux
(74) *Attorney, Agent, or Firm* — Lathrop GPM, LLP (57) ABSTRACT

The present invention relates to a wind turbine assembly system which proposes an alternative to conventional cranes, having a main lifting structure configured to withstand the load of at least one tower section or at least one wind turbine component, and at least one secondary lifting structure configured to perform the lifting of the main lifting structure with respect to the wind turbine tower, in addition relating to a wind turbine assembly method according to the previous system, as well as the wind turbine assembled with the previous method.

16 Claims, 8 Drawing Sheets

(51) Int. Cl.
*F03D 13/10* (2016.01)
*B66C 23/18* (2006.01)
*B66C 23/20* (2006.01)

(52) U.S. Cl.
CPC ............ *F03D 13/10* (2016.05); *F03D 13/20* (2016.05); *F05B 2230/50* (2013.01); *F05B 2230/61* (2013.01); *F05B 2240/916* (2013.01); *Y02E 10/726* (2013.01); *Y02E 10/728* (2013.01); *Y02P 70/523* (2015.11)

(56) References Cited

U.S. PATENT DOCUMENTS

| | | | | |
|---|---|---|---|---|
| 8,584,429 | B2* | 11/2013 | Zavitz | E04H 12/344 |
| | | | | 52/123.1 |
| 8,601,748 | B2* | 12/2013 | Delago | F03D 13/10 |
| | | | | 52/119 |
| 9,238,923 | B2* | 1/2016 | Arlaban Gabeiras | ........................ |
| | | | | E04H 12/342 |
| 2009/0087311 | A1* | 4/2009 | Wyborn | E04H 12/08 |
| | | | | 416/9 |
| 2013/0081337 | A1* | 4/2013 | Zavitz | E04H 12/344 |
| | | | | 52/123.1 |
| 2014/0175038 | A1* | 6/2014 | Arlaban Gabeiras | ........................ |
| | | | | E04H 12/342 |
| | | | | 212/195 |

* cited by examiner

WIND TURBINE ASSEMBLY SYSTEM AND ASSOCIATED METHOD

OBJECT OF THE INVENTION

The present invention can be included in the technical field of wind turbine assembly systems.

The wind turbine assembly system of the present invention proposes an alternative to conventional cranes having a main lifting structure configured to withstand the load of at least one tower section or at least one wind turbine component, and at least one secondary lifting structure configured to perform the lifting of the main lifting structure with respect to the wind turbine tower.

Additional objects of the invention are also the method for assembling a wind turbine according to the previous system, as well as the wind turbine assembled with the previous system.

BACKGROUND OF THE INVENTION

The increase in the rated power of wind turbines entails the increase in weights and dimensions of all the turbine components in general, but the following aspects are of special relevance for the assembly costs:
  The height of the tower;
  Diameter of the rotor and weight of the blades-hub unit;
  Weight of the nacelle and subcomponents;
  Weight of the tower sections.

Of the above, the most relevant is the height of the tower, existing already designs of 120 m and more, especially for the assembly of relatively voluminous and heavy components such as the aforementioned: the large overturning moments associated to the increase in height make it necessary to have a high capacity crane.

The use of these cranes is expensive, firstly due to the availability problems that make the daily rental cost expensive: there is not a large amount of this type of cranes; and second, the high costs associated to transport due to the large number of trucks that are needed to move them. According to data shown in U.S. Pat. No. 8,011,098B2, the rental costs of the crane for tower assembly, can come to $80000 per week, together with the almost $100000 of transport costs (using forty or more trucks).

These high costs justify the search for alternative means to build wind turbines, including the tower.

References are known in the state of the art related to two types of solution:
  Self-climbing systems (understanding as such structures that are supported and raised throughout the tower);
  Bridge-crane type solutions supported on lattices on the ground.

Among the climbing solutions, U.S. Pat. No. 6,868,646B2 is known regarding a method and means for erecting a wind turbine tower.

Said means incorporate two structures: a lower one, whereto a hoist cable is fastened at a point close to the lower part, and an upper one, which supports the bridge crane-type structure. The hoist cable passes through a pulley fastened to a suitable fastening point in the tower close to the upper part of each section and it is wound in a winch located on the ground.

The system goes up and down the tower every time a section is assembled. Then, once it has been assembled on top of the lower sections of the tower, the unit is lowered, another section is fastened and it is hoisted again. The lower structure incorporates a wheel/roller system adapted to cooperate with guides situated in the tower.

International application WO2011/031577A2 relates to a method and apparatus for wind turbine erection incorporating a mechanism secured to the lifting structure which makes it possible to move the structure along the tower resting on it. Later, once the lifting structure is in position, it is fastened to the tower and a new section is assembled. Therefore, the invention discloses caterpillar-type systems which adapt to the conical shape of the tower. This system may be expensive due to the complexity of the system so that the system climbs along the tower, especially in conical solutions.

Related to bridge crane-types structures, U.S. Pat. No. 8,011,098B2 is known which discloses a bridge crane-type structure supported by a self-supporting lattice incorporating actuators capable of lifting the lattice structure and the bridge crane for inserting additional lattice sections and increasing height to be able to assemble the tower, nacelle and rotor. With the current tower perimeter dimensions, the lattice sections must be assembled in situ, since they would exceed the transport dimensions. In said structure the tower sections are horizontally fed by means of carriages to also dispense with auxiliary cranes that position them close to the tower base.

The self-climbing structures can be light and have reduced dimensions, as they use as support of the weight of the assembled components the tower (or the part of the tower already assembled).

However, the self-climbing structures by pulleys, jacks or similar require some kind of guiding of the structure over the tower to guarantee that there is no interference with the tower during the lifting of the structure. In the case of a conical tower, a typical design of concrete is used, the guiding system becomes complicated, as it requires a spring-type element to guarantee the compression of wheels or rollers on the tower surface and avoid said interference. Alternatively, the climbing is performed by friction between a mechanism disposed on the structure and the tower. In this case, it is again required that the mechanism is capable of adapting to the towers conical shape.

Furthermore, the lattice-based structures are large structures that will require a large number of trucks for their transport. They have the advantage, compared with climbing solutions, that they can be used with any type of tower without the need to vary their design, since it is not necessary to provide them with additional fastening points or supports to fasten the climbing structure.

There are other solutions wherein an auxiliary structure enables to lift the lifting structure so that once it has been fixed in an upper section of tower, it is possible to perform the lifting of a subsequent section.

However, these solutions make the stresses withstood by said auxiliary structures very high, that could eventually cause their failure, with consequences for the installation and/or the operators that work therein, as well as the economic losses associated to said failure.

The wind turbine assembly system of the present invention solves all the previous drawbacks.

DESCRIPTION OF THE INVENTION

The present invention resolves the technical problem posed, by means of a wind turbine assembly system comprising:

a main lifting structure configured to withstand the load of at least one tower section or at least one wind turbine component, and at least one secondary lifting structure configured to perform the lifting of the main lifting structure with respect to the wind turbine tower, wherein the secondary lifting structure comprises lifting means for the main lifting structure which operate from a height above the centre of gravity of the main lifting structure.

In this way, the lifting of the main structure is carried out from a position disposed all the time above the centre of gravity of said main lifting structure, in this way reducing the stresses that must be withstood by the secondary lifting structure.

The lifting means comprises hoist pulleys and first hoist cables which pass through the hoist pulleys, where the first hoist cable comprise ends which are fixed to the main lifting structure at a point situated above its centre of gravity, the hoist pulleys in turn being disposed above said centre of gravity of the main lifting structure once the lifting thereof has been performed.

Optionally, the wind turbine assembly system further comprises at least one supplementary fixing structure configured to be fastened to the wind turbine tower and transfer the load of the main lifting structure to the tower.

Thus, the fixing of said main lifting structure to the tower is performed through the supplementary fixing structure, which is optionally pre-assembled in each tower section or wind turbine component due to be lifted prior to the lifting.

Likewise, and optionally, the secondary lifting structure is pre-assembled in the tower section or wind turbine component to be lifted, so that once the main lifting structure has carried out the lifting of the at least one tower section or the at least one wind turbine component, the secondary lifting structure may perform the lifting of the main lifting structure with respect to the wind turbine tower, for its fixing to the tower at a higher level, and in this way being able to perform the lifting of at least the following tower section or wind turbine component to be lifted by means of the main lifting structure.

Optionally, said secondary lifting structure comprises a lattice structure whereon pulleys or winches are assembled, wherethrough first hoist cables pass, the ends whereof are fixed to the main structure at a point situated above its centre of gravity, the pulleys or winches in turn being above said centre of gravity once the main lifting structure has been lifted.

The main lifting structure, configured to withstand the load of at least one tower section or at least one wind turbine component, comprises a system of fixed and movable pulleys wherethrough the load of the at least one tower section or at least one wind turbine component to be lifted is guided, a load which is supported by second hoist cables, second hoist cables which are wound on winches positioned on the ground.

Optionally, the wind turbine assembly system comprises a controlled counterweight system which adjusts the tension of the second hoist cables as the load of at least one tower section or at least one wind turbine component advances towards the tower axis by means of counterweight cables disposed in opposite configuration to the second hoist cables with respect to the tower axis, to cancel out the rotation momentum of the load of at least one tower section or at least one wind turbine component with respect to the tower base, which allows having the main lifting structure compressed from two points all the time.

The wind turbine assembly method of the present invention comprises the following stages:

lifting of at least one tower section or at least one wind turbine component by means of a main lifting structure, lifting of the main lifting structure by means of at least one secondary lifting structure, where the lifting of the main lifting structure by means of the at least one secondary lifting structure is carried out from a position disposed at a height above the centre of gravity of the main lifting structure.

Optionally, the wind turbine assembly method further comprises the fastening to the wind turbine tower of at least one supplementary fixing structure to transfer the load of the main lifting structure to the tower.

The present invention also relates to the wind turbine assembled by means of the previous wind turbine assembly method.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

DETAILED DESCRIPTION OF THE INVENTION

The wind turbine assembly system of the present invention shall be described in detail below.

Said wind turbine assembly system comprises:
a main lifting structure (1) configured to withstand the load of at least one tower section (2) or at least one wind turbine component (3, 4), and
at least one secondary lifting structure (5) configured to perform the lifting of the main lifting structure (1) with respect to the wind turbine tower, a secondary lifting structure (5) comprising lifting means (7, 17) of the main lifting structure (1) which operate from a height above the centre of gravity of the main lifting structure (1).

Preferably, the secondary lifting structure (5) comprises a lattice structure (6) whereon the lifting means (7, 17) are disposed, preferably hoist pulleys (17) and first hoist cables (7) which pass through the hoist pulleys (17), where the first hoist cables (7) comprise ends which are fixed to the main lifting structure (1) at a point situated above its centre of gravity, the hoist pulleys (17) in turn being disposed above said centre of gravity of the main lifting structure (1) once the lifting thereof (1) has been performed.

Each secondary lifting structure (5) is pre-assembled in the tower section (2) or wind turbine component (3, 4) to be lifted so that once the main lifting structure (1) has carried out the lifting of said tower section (2) or wind turbine component (3, 4), it can perform the lifting of the main lifting structure (1) with respect to the wind turbine tower, for the fixing of said main lifting structure (1) to the tower at a higher level, and in this way being able to perform the lifting of at least the following section or wind turbine component to be lifted.

Preferably, the lifting means (7, 17) operate from a height above the centre of gravity of the main lifting structure (1) when the main lifting structure (1) and the secondary lifting structure (5) are disposed in the same tower section (2) or wind turbine component (3, 4), or when the secondary lifting structure (5) is disposed in a tower section (2) or wind turbine component (3, 4) above the tower section (2) where the main lifting structure (1) is disposed, where in this last case, the position of the secondary lifting structure (5), once the tower section (2) in the which is pre-assembled has been assembled, is such that it has the advantage of at least one tower section (2) with respect to the position of the main lifting structure (1).

The wind turbine assembly system further comprises a supplementary fixing structure (8) for each tower section (2) to be assembled, a set of tower sections (2) to be assembled or wind turbine component (3, 4) to be assembled, where said supplementary fixing structures (8) are configured to be fastened to the tower section (2) or wind turbine component (3, 4) to be assembled prior to its lifting and transfer the load of the main lifting structure (1) to the tower once the tower section (2), set of tower sections (2) or wind turbine component (3, 4), where the supplementary fixing structure (8) has been fastened, has been assembled on the previous tower section (2) or on the tower base.

Each supplementary fixing structure (8) comprises first areas (9) configured to anchor the main lifting structure (1) to said supplementary fixing structure (8) and second areas (10) configured to anchor the supplementary fixing structure (8) to the tower. In this way, each supplementary fixing structure (8) allows the dimensions of the main lifting structure (1) to be adapted to the dimensions of the tower sections (2).

Preferably, the first areas (9) of the supplementary fixing structures (8) are cross-members whereon the main lifting structure (1) rests on support points (11), whilst the second areas (10) are a frame which is coupled to the tower section (2). Preferably, the support points (11) whereon the main lifting structure (1) rests are fixed, where the polygon which form said support points (11) allows housing in its interior all the tower sections (2) and/or wind turbine components (3, 4).

Figure 4:
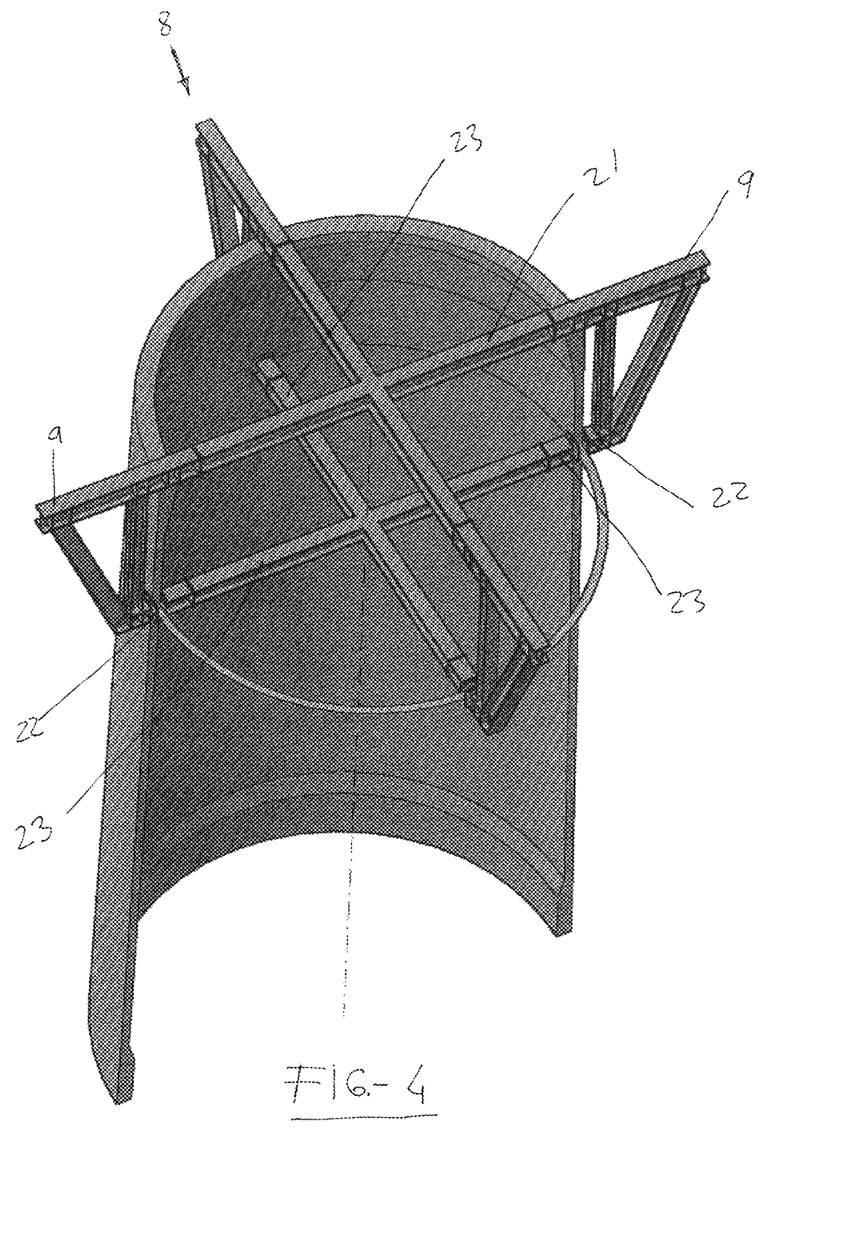
FIG. 4 shows a perspective view of an embodiment of the supplementary fixing structure configured to be fastened to the wind turbine tower according to an example of embodiment.

In an example of embodiment shown in FIG. 4, the second areas (10) configured to anchor the supplementary fixing structure (8) to the tower comprise external beams (21) which vertically rest on the tower section (2) and side legs (22) which rest on the outer lateral surface of the tower. To compensate these lateral stresses, the supplementary fixing structure (8) to the tower comprises internal beams (23), which rest on at least 3 points of the inner surface of the tower section (2). Alternatively to said internal beams (23), the side legs (22) may rest on distribution plates, distribution plates of itself or of the tower, or the tower may incorporate greater reinforcement in said area.

Both the secondary lifting structures (5) and the supplementary fixing structures (8) are detachable, i.e. they are removed from the tower section (2) which has been assembled, after the lifting of the main lifting structure (1).

The main lifting structure (1) comprises a system of fixed pulleys (12) and movable pulleys (13) wherethrough (12, 13) the load of the at least one tower section (2) or at least one wind turbine component (3, 4) to be lifted is guided, a load which is supported by second hoist cables (14) which are wound on winches (15) positioned on the ground. The hoist winches (15) are preferably in a front area of the tower, wherefrom the lifting is carried out, as shown in FIG. 1.

The wind turbine assembly system further comprises a controlled counterweight system which adjusts the tension of the second hoist cables (14) as the load advances of at least one tower section (2) or at least one wind turbine component (3, 4) towards the tower axis by means of counterweight cables (16) disposed in opposite configuration to the second hoist cables (14) with respect to the tower axis, directly to foundations or with mooring.

The ends of the counterweight cables (16) are joined to tension regulation means (not shown) so that the load remains centred in the tower axis. The counterweight system further comprises force sensors (not shown) disposed on supports of the main structure to the ground, so that the tension of said counterweight cables (16) is adjusted in such a way that the forces on said supports cancel out the momentum with respect to the tower base.

Figure 1:
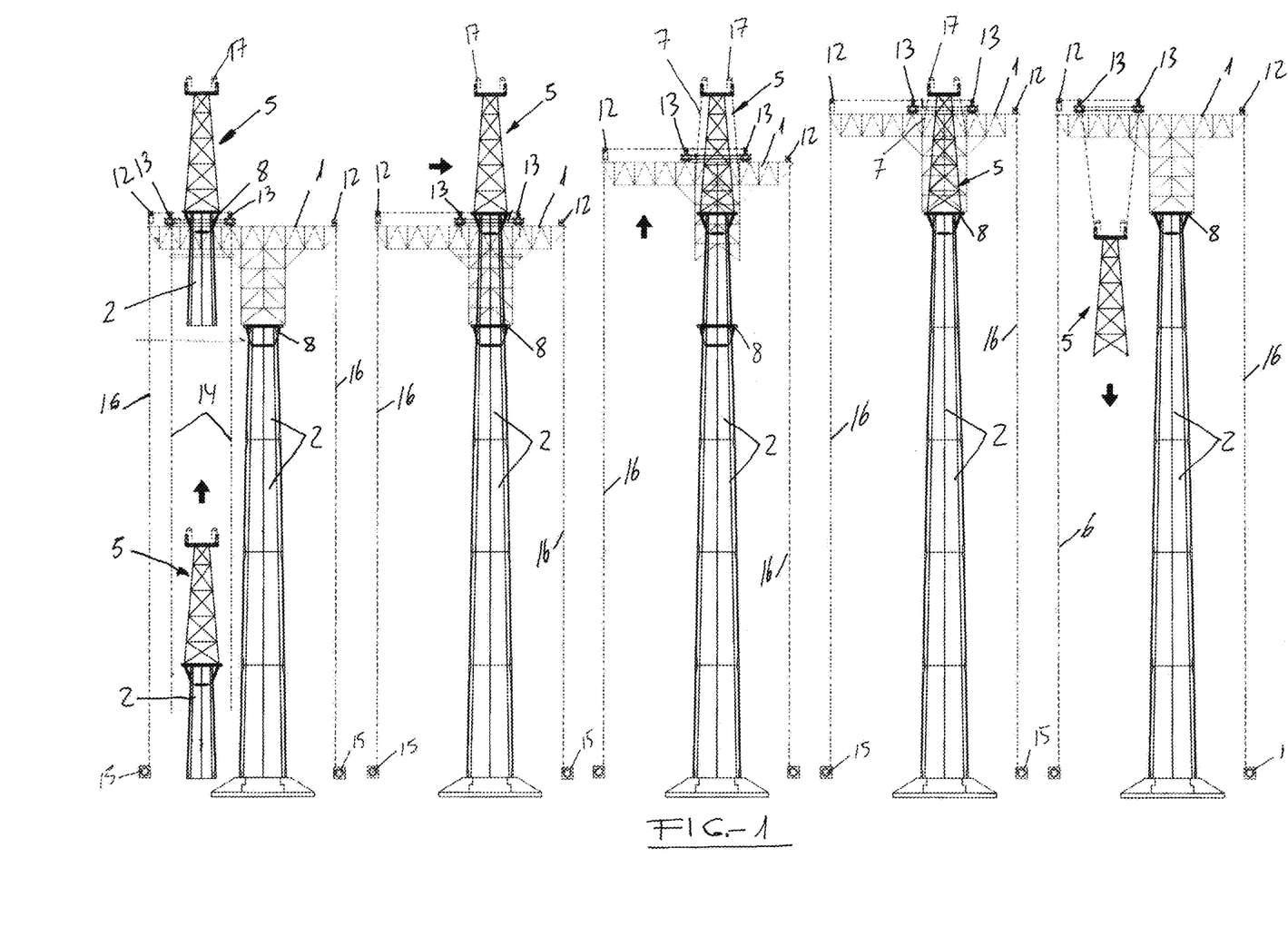
FIG. 1 shows a diagram of the stages of assembly of an intermediate tower section with the wind turbine assembly system of the present invention, understanding intermediate section to be any tower section disposed between the first section or section fixed to the tower base and final section or section adjacent to the nacelle.
Figure 2:
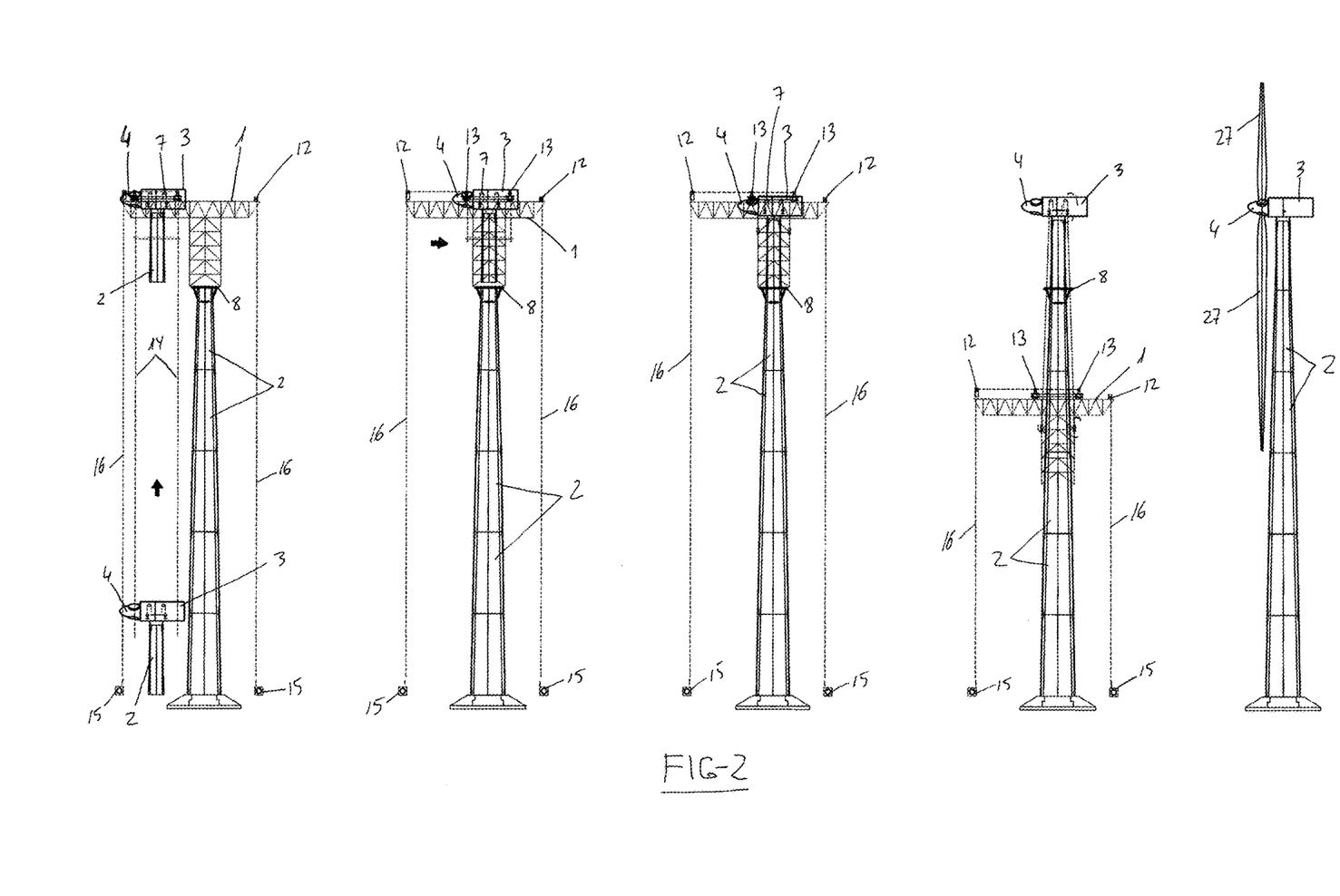
FIG. 2 shows a diagram of the stages of assembly of the upper tower section, of the nacelle and of the hub of the wind turbine with the wind turbine assembly system of the present invention.
Figure 3A:
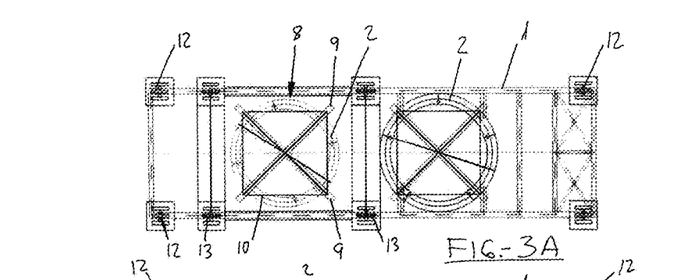
FIGS. 3A to 3E show a plan view of the stages of assembly of the intermediate sections of the wind turbine with the wind turbine assembly system of the present invention.
Figure 3B:
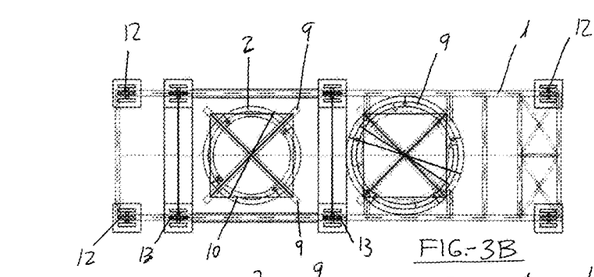
Figure 3C:
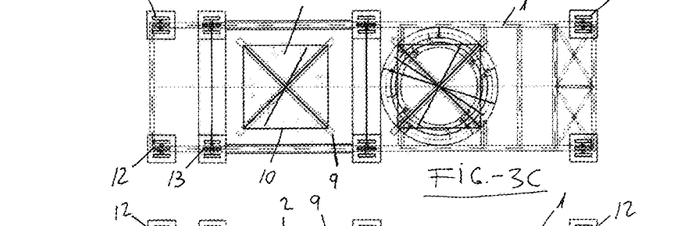
Figure 3D:
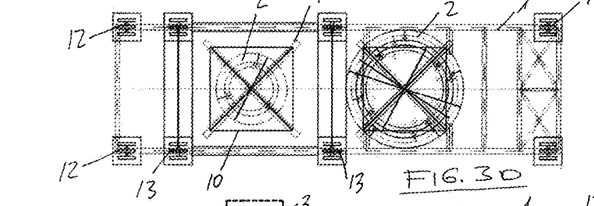
Figures 3E, 3G:
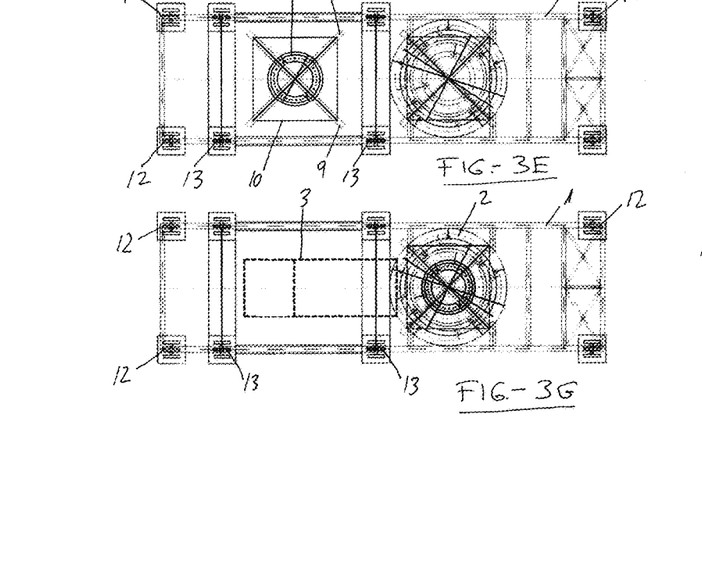
FIGS. 3F to 3H show a plan view of the stages of assembly of the upper tower section, of the nacelle and of the hub of the wind turbine with the wind turbine assembly system of the present invention.
Figure 3F:
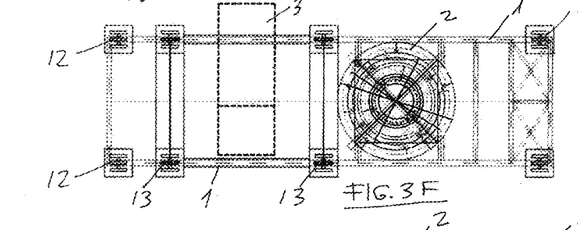
Figure 3H:
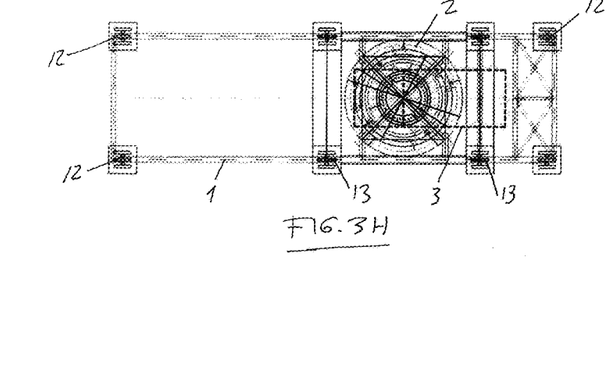

In the example of embodiment as shown in FIGS. 1 and 2, the main lifting structure (1) is configured to withstand the load of the sub-assembly formed by the upper tower section (2) together with the nacelle (3) and the hub (4), preferably the dimensions (height and length of the fork) and load capacity of the main lifting structure (1) are configured to assemble said sub-assembly formed by the upper tower section (2) together with the nacelle (3) and the hub (4). This allows lifting the sub-assembly by gripping it from points above the resulting centre of gravity but in a way so that it leaves a sufficient distance between the fastenings to said anchoring points and the corresponding pulleys (12, 13) of the main lifting structure (1). This enables that the centre of gravity of the main lifting structure (1), once the last sub-assembly has been assembled, remains below the frame of the nacelle (3), which facilitates the lowering of the main lifting structure (1) once the assembly of the tower and the nacelle (3) has been completed. To do this, the wind turbine assembly system comprises lowering elements, among which it is possible to find hollow cylinders, pulleys, winches and lowering elements which are fixed to the frame of the nacelle (3) or an upper tower section (2) to perform the lowering of said main lifting structure (1) to the ground.

In another example of embodiment, the main lifting structure (1), preferably its height, is configured to withstand the load of the sub-assembly formed by two tower sections (2) and the following wind turbine component (3): a nacelle (3), so that the number of lifting stages of the main lifting structure are reduced and so they are the assembly times.

In another example of embodiment, the main structure has a length which allows housing in its interior at least two lifting areas (18, 19, 20) diametrically opposite with respect to the tower base, lifting areas (18, 19, 20) wherefrom the lifting is carried out vertically from at least two points disposed diametrically opposite the tower base. This allows lifting one tower section (2) or at least one wind turbine component (3, 4) located in a first lifting area (18), and whilst all the necessary operations associated to said tower section (2) or at least one wind turbine component (3, 4) are being performed, to pre-assemble another tower section (2) or at least another wind turbine component (3, 4) in a second lifting area (19) diametrically opposite the first lifting area (18). In this way, the assembly system is more versatile and the assembly times are reduced.

Figure 6:
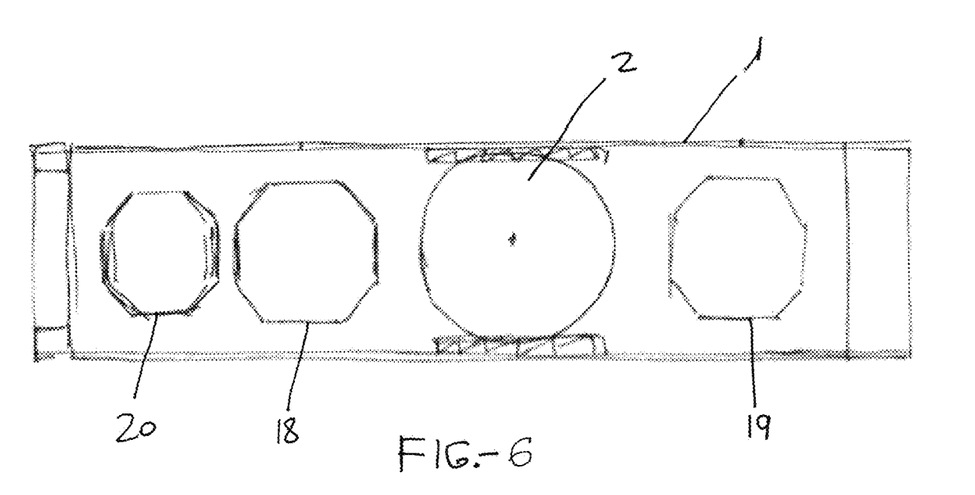
FIG. 6 shows a plan view of a preferred embodiment of the main lifting structure which allows the lifting of tower sections or wind turbine components from points diametrically opposite the centre of the tower.

Preferably, as shown in FIG. 6, the main structure has a length which allows housing in its interior three lifting areas (18, 19, 20), the first lifting area (18) and a third lifting area (20) being diametrically opposite with respect to the tower base to the second lifting area (19). This allows having pre-assembled three tower sections (2) prior to the assembly of the tower and whilst said tower sections (2) are assembled, to pre-assemble other tower sections (2). In this way, there is no need of complex supply systems of sections to the lifting areas (18, 19, 20) near the tower base nor a rotation system for the main lifting structure (1) or a structure with a yaw system are required. In particular, with said layout, it is especially advantageous to perform the assembly according to a sequence wherein after assembling a first section (2) from a first lifting area (18) by means of the main lifting structure (1), a second section (2) is then assembled from the second lifting area (19) diametrically opposite the first lifting area (18) with respect to the tower base, and whilst the lifting of this second section (2) is being carried out by means of the main lifting structure (1), a third section (2) is pre-assembled in the third lifting area (20).

Figure 7:
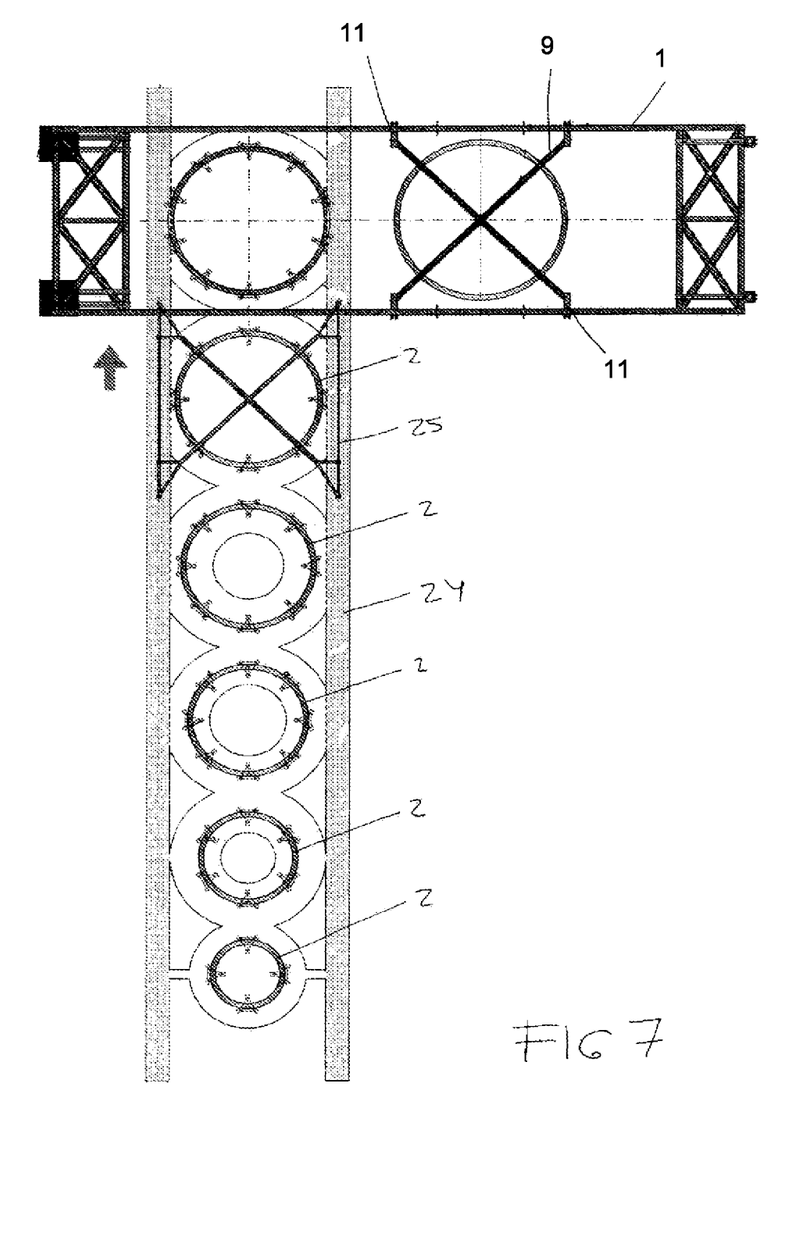
FIG. 7 shows a plan view of a preferred embodiment of the main lifting structure alternative to FIG. 6.
Figure 8:
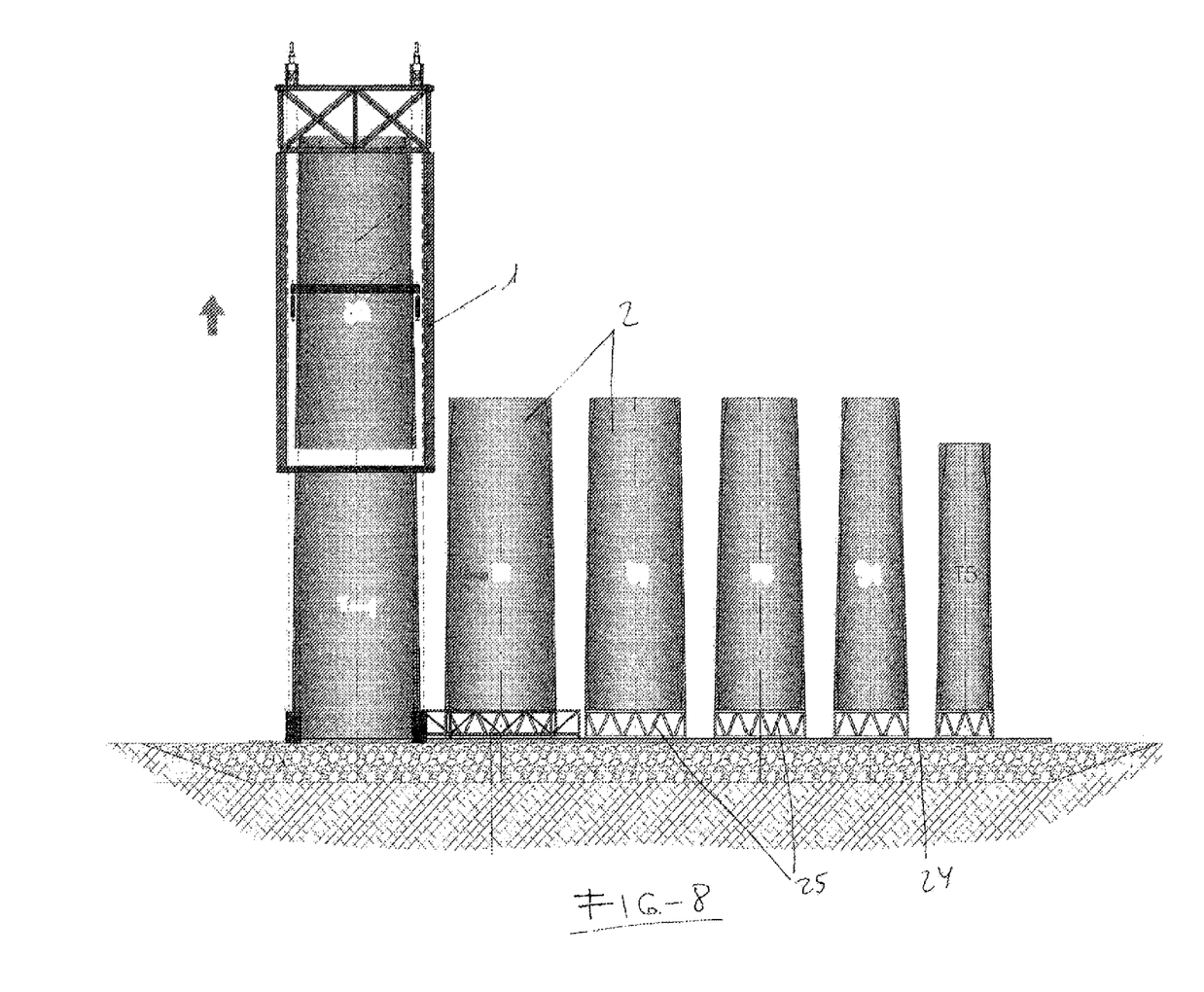
FIG. 8 shows an elevational view of FIG. 7.

The wind turbine assembly system further comprises rails (24), as observed in FIG. 7, whereon displacement tools (25) of the sections (2) are disposed on the rails (24) to approximate them to the first lifting area (18), and in this case only lifting area.

Figure 5:
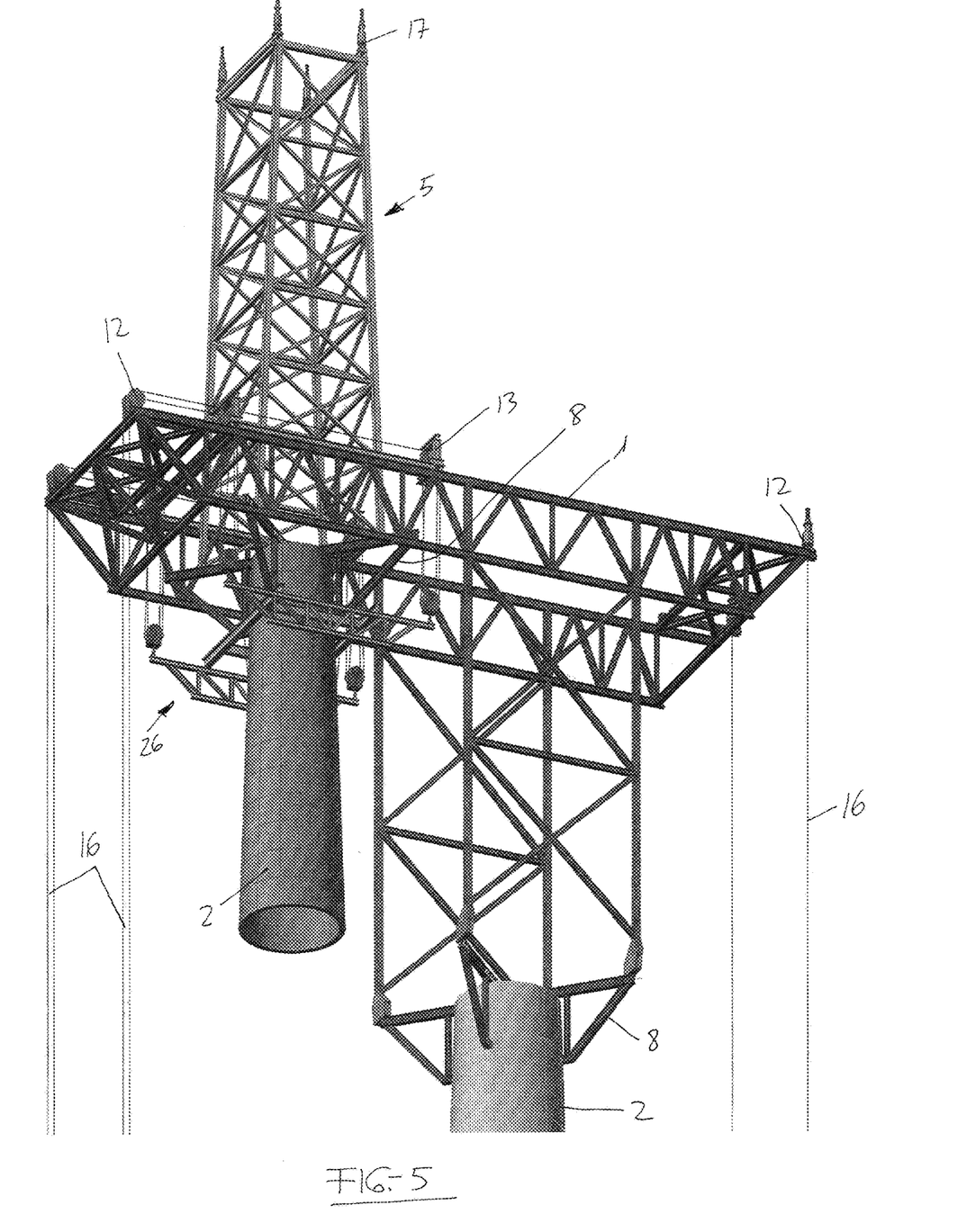
FIG. 5 shows a perspective view of the wind turbine assembly system of the present invention when the lifting of a section is carried out.

In FIG. 5, an auxiliary lifting tool (26) is observed, which is fixed to the supplementary fixing structure (8) and which, through the second hoist cables (14), assists in the lifting of the section (2) by the main lifting structure (1).

The wind turbine assembly method of the present invention comprises the following stages:
   lifting of at least one tower section (2) or at least one wind turbine component (3, 4) by means of a main lifting structure (1),
   lifting of the main lifting structure (1) by means of at least one secondary lifting structure (5), from a position disposed at a height above the centre of gravity of the main lifting structure (1).

Optionally, the lifting of at least one tower section (2) or at least one wind turbine component (3, 4) by means of a main lifting structure (1) is carried out for at least two tower sections (2), where the lifting of a first tower section (2) is carried out from a first lifting area (18) and the lifting of a second tower section (2) is carried out from a second lifting area (19) diametrically opposite the first lifting area (18).

The wind turbine assembly method further comprises a transfer to the tower support vertical or to the nacelle (3) and optionally a lowering to the tower of at least one tower section (2) or at least one wind turbine component (3, 4) by means of the main lifting structure (1), after the lifting of at least one tower section (2) or at least one wind turbine component (3, 4) by means of the main lifting structure (1).

The wind turbine assembly method further comprises the fastening to the wind turbine tower of at least one supplementary fixing structure (8), to transfer the load of the main lifting structure (1) to the tower after the lowering to the tower of at least one tower section (2) or at least one wind turbine component (3, 4) by means of the main lifting structure (1), where the fastening to the wind turbine tower of at least one supplementary fixing structure (8) is carried out prior to the lifting of at least one tower section (2) or at least one wind turbine component (3, 4) by means of the main lifting structure (1).

The wind turbine assembly method further comprises the pre-assembly of the secondary lifting structure (5) on the tower section (2) or wind turbine component (3, 4) due to be lifted prior to the lifting of at least one tower section (2) or at least one wind turbine component (3, 4), so that once the main lifting structure (1) has lifted at least one tower section (2) or at least one wind turbine component (3, 4), it can lift the main lifting structure (1) with respect to the wind turbine tower.

The wind turbine assembly method further comprises the lowering of the secondary lifting structure (5) and/or of the supplementary fixing structure (8) after the lifting of the main lifting structure (1) with respect to the wind turbine tower.

When the component of the wind turbine to be lifted in the lifting of at least one tower section (2) or at least one wind turbine component (3, 4) by means of the main lifting structure (1) is the nacelle (3), this lifting is carried out in transversal position of said nacelle (3), to then perform the rotation of said nacelle (3), the movement of said nacelle (3) through the main lifting structure (1), and prior to the transfer to the tower support vertical and lowering of the nacelle (3) to the tower through the main lifting structure (1).

When the component of the wind turbine to be lifted in the lifting of at least one tower section (2) or at least one wind turbine component (3, 4) by means of the main lifting structure (1) is the hub (4), the transfer is carried out to the nacelle (3), without associated lowering.

The wind turbine assembly method further comprises the lowering of the main lifting structure (1) once the transfer of the hub (4) to the nacelle (3) has been performed, and before lowering the secondary lifting structure (5).

The wind turbine assembly method further comprises the positioning of the blades (27) in the hub (4) once the lowering of the main lifting structure (1) has been performed.

The present invention also relates to the wind turbine assembled by means of the previous wind turbine assembly method.

The invention claimed is:
1. Wind turbine assembly system comprising:
   a main lifting structure mounted on a first tower section configured to withstand the load of at least one tower section of a wind turbine tower or at least one wind turbine component of a wind turbine comprising the wind turbine tower; and at least one secondary lifting structure mounted on a second tower section and configured to perform a lifting of the main lifting structure wherein the main lifting structure comprises a first lifting means for lifting the secondary lifting structure, wherein the first lifting means operates from a position above a center of gravity of the secondary lifting structure, wherein the secondary lifting structure comprises lifting means for lifting the main lifting structure wherein the second lifting means operates from a position above a center of gravity of the main lifting structure, and wherein the main lifting structure comprises a system of fixed pulleys and movable pulleys wherethrough the load of the at least one tower section or at least one wind turbine component to be lifted is guided, a load which is supported by ground winch hoist cables which are wound on winches positioned on the ground.

2. The system of claim 1, wherein the secondary lifting structure comprises a lattice structure whereon the lifting means of the main lifting structure are disposed.

3. The system of claim 2, wherein the lifting means comprise hoist pulleys and first hoist cables which pass through the hoist pulleys, where the first hoist cables comprise ends which are fixed to the main lifting structure at a point situated above its centre of gravity, the hoist pulleys in turn being disposed above said centre of gravity of the main lifting structure once the lifting of the main lifting structure has been performed.

4. The system of claim 1, further comprising at least one supplementary fixing structure configured to be fastened to the wind turbine tower and transfer the load of the main lifting structure to the wind turbine tower.

5. The system of claim 4, comprising a supplementary fixing structure for each tower section to be assembled, for a set of tower sections to be assembled or for a wind turbine component to be assembled, where said supplementary fixing structures are configured to be fastened to the tower section or wind turbine component to be assembled prior to its lifting.

6. The system of claim 4, wherein each supplementary fixing structure comprises first areas configured to anchor the main lifting structure to said supplementary fixing structure and second areas configured to anchor the supplementary fixing structure to the tower.

7. The system of claim 6, wherein the first areas of the fixing structures are cross-members whereon the main lifting structure rests on support points, whilst the second areas are a frame which is coupled to the tower section.

8. The system of claim 7, wherein the support points whereon the main lifting structure rests are fixed, where a polygon said support points form allows housing in its interior all the tower sections and/or wind turbine components.

9. The system of claim 1, further comprising a controlled counterweight system which adjusts the tension of the ground winch hoist cables as the load advances of at least one tower section or at least one wind turbine component towards the tower axis by means of counterweight cables disposed in configuration opposite the ground winch hoist cables with respect to the tower axis.

10. The system of claim 1, wherein the main lifting structure is configured to withstand the load of a subassembly formed by an upper tower section and the following wind turbine components: a nacelle and a hub.

11. The system of claim 1, further comprising lowering elements which are fixed to a frame of a nacelle or to an upper tower section to perform lowering of said main lifting structure to the ground.

12. The system of claim 1, wherein the main lifting structure is configured to withstand the load of a subassembly formed by two tower sections and the following wind turbine component: a nacelle.

13. The system of claim 1, wherein the main lifting structure has a height which allows assembling a subassembly formed by a tower section and the following wind turbine component: a nacelle.

14. The system of claim 1, wherein the main lifting structure has a length which allows housing in its interior at least two lifting areas diametrically opposite with respect to a tower base, lifting areas wherefrom is carried out lifting vertically from at least two points disposed diametrically opposite the tower base.

15. The system of claim 1 wherein the at least one secondary lifting structure is configured to be pre-assembled in the at least one tower section or the at least one wind turbine component to be lifted.

16. The system of claim 1 wherein the main lifting structure comprises a first set of pulleys for lifting the secondary lifting structure, wherein the first set of pulleys operates from a position above a center of gravity of the secondary lifting structure, and wherein the secondary lifting structure comprises a second set of pulleys for lifting the main lifting structure wherein the second set of pulleys operates from a position above a center of gravity of the main lifting structure.

* * * * *